Feb. 8, 1949.   L. E. HAMILTON   2,461,379
BINOCULAR SHUTTER MECHANISM
Filed Aug. 8, 1947   2 Sheets-Sheet 2

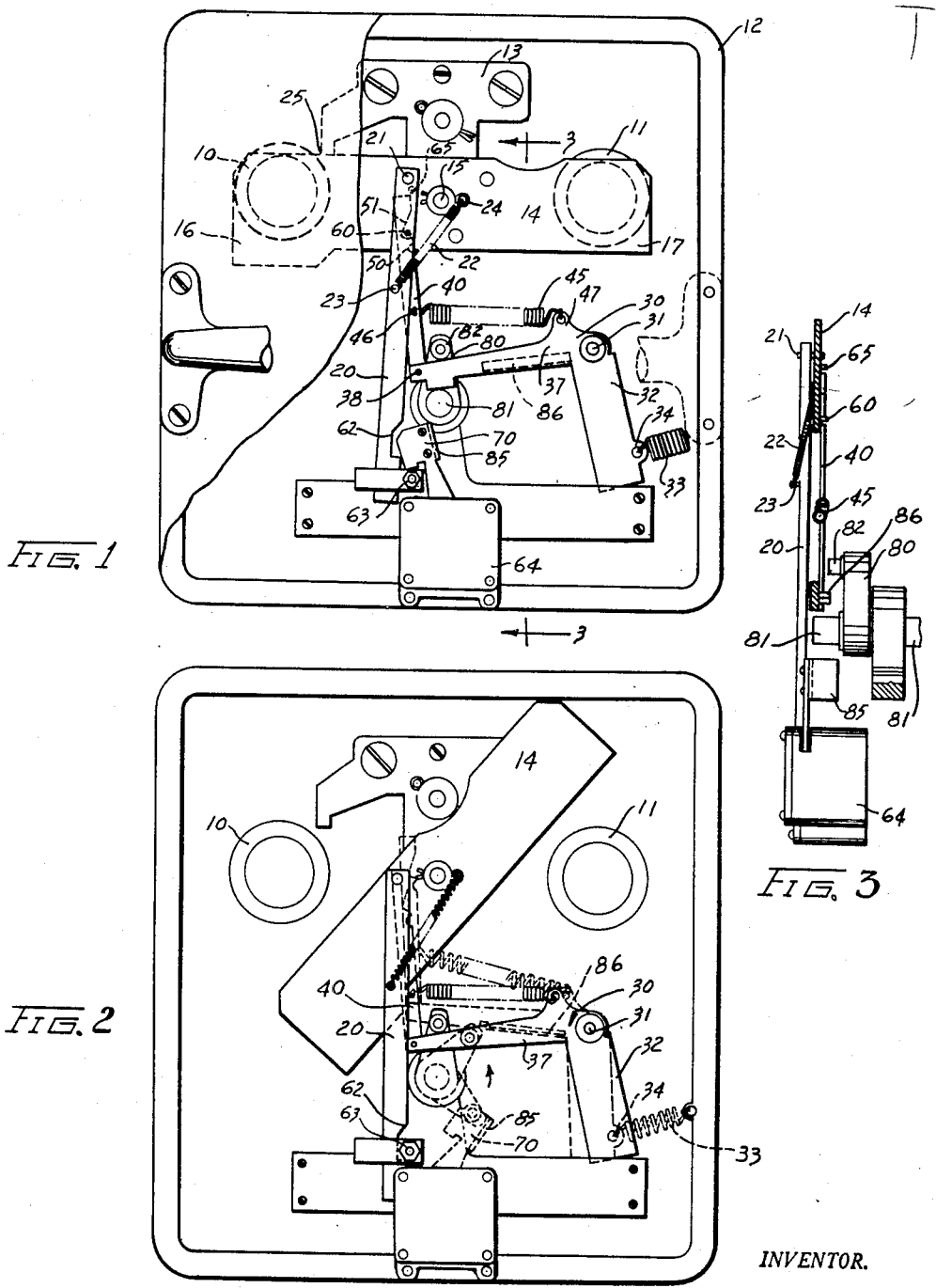

INVENTOR.
LAWRENCE E. HAMILTON
BY
Ostrolenk & Faber
ATTORNEYS

Patented Feb. 8, 1949

2,461,379

UNITED STATES PATENT OFFICE 2,461,379

BINOCULAR SHUTTER MECHANISM

Lawrence Earl Hamilton, Holly Hill, Fla.

Application August 8, 1947, Serial No. 767,395

7 Claims. (Cl. 161—26)

My present invention relates to coin-operated viewing devices, and more particularly to coin-operated shutters in coin-operated binoculars or telescopes placed at points of interest for use by the public on depositing a coin.

Essentially my invention relates to the provision of a shutter which will block the view through the binocular or other viewing device until a coin-released operating mechanism removes the shutter from the blocking arrangement, at which time a timing mechanism is brought into action to replace the shutter in blocking position at the expiration of a predetermined time interval.

Heretofore in the construction and operation of shutters and other associated mechanisms for telescopic or binocular viewers, complex operating and latching mechanisms were provided which required frequent servicing, replacement and repair. My present invention is directed to simplified operating, latching and timing mechanisms which co-act with a novel rotatable shutter to provide a simplified structure which can not easily be put out of service and requires a minimum of maintenance and repair.

Essentially my invention comprises a shutter pivotally mounted so that it may rotate from a position at which it intercepts the light passing through both lens systems to a position which is angularly displaced by a relatively small amount of the order of approximately 45°, where it no longer intercepts light through the double binocular system. Preferably, the shutter is pivotally mounted between the lens system but may be mounted at any point where it can pivot into and out of the light path through the lens system.

My novel shutter is combined with a simplified latch arm which will automatically engage a latching element. The timing mechanism is so arranged that a lever which is displaced in one direction during the movement of the shutter to the open position will move back as regulated by the timing mechanism and then push the latching arm off the latch element to permit a simple re-setting spring to return the shutter and the latch arm to the original position.

My novel unit also includes simplified mechanical elements operated by the coin-released manually operated lever to move the shutter and the latch arm from the closed to the open position wherein the timing mechanism may then regulate the return of the shutter and latch arm back to the original position.

Thus the primary object of my invention is the provision of a novel simplified coin-controlled manually operated shutter mechanism for a public viewing device.

A further object of my invention is the provision of a novel rotatable shutter for a public viewing device.

Still another object of my invention is the provision of a novel simplified latch means which is readily engageable and disengageable in connection with the shutter of my novel viewing device.

Still another object of my invention is the provision of novel simplified means for moving the shutter from the closed to the open position where it is latched in the open position until the operation of the timing mechanism releases the latch to return the shutter to the closed position.

The foregoing and many other objects of my invention will become apparent from the following description and drawings in which Figure 1 is an elevation partly broken away showing my shutter and the associated mechanism in the closed position;

Figure 2 is a view corresponding to that of Figure 1 but showing my novel shutter mechanism in the latched open position;

Figure 3 is a cross-sectional view taken on line 3—3 of Figure 1 looking in the direction of the arrows;

Figure 4:
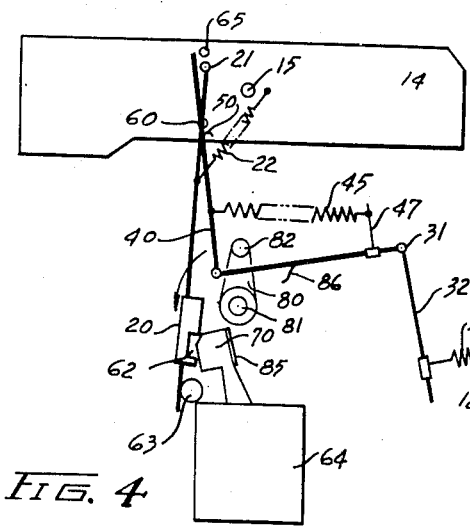
Figure 4 is a schematic diagram showing the position of the parts when the shutter mechanism is in the closed position of Figure 1.

Referring now to the figures, the lens systems 10 and 11 forming the binocular viewing device are preferably constructed in the manner shown in Patent No. 2,131,163 and are supported in any suitable manner in a housing or case 12. A bracket 13 is also supported in any suitable manner from an interior wall of the housing or case 12. The shutter 14 is pivotally mounted on the pin 15 which in turn is supported on the bracket 13. The shutter 14 has lateral elements 16 and 17 which intercept respectively the light directed through lens systems 10 and 11.

A latch arm 20 is pivotally connected to the pin 21 on shutter 14, slightly displaced to the left of the pin 15 around which the shutter rotates. Tension spring 22 is connected between pin 23 on latch arm 20 and the head of the cotter pin 24, which assists in holding the shutter 14 on the pin 15. Tension spring 22 thus biases the latching arm 20 into counterclockwise rotation around its pivot 21; and since the upward end of tension spring 22 is on the right-hand side of the pin 15 while the lower end of the tension spring 22 is on the left-hand side of pin 15, the single tension spring 22 not only serves to bias the latch arm to latching position but also serves to raise the latch arm 20 thereby exerting an upward bias on the pin 21 which is secured to the shutter 14 and therefore tends to rotate the shutter 14 in a clockwise direction wherein the end section 16 of shutter 14 is biased upwardly against the stop 25 on bracket 13.

Thus the tension spring 22 biases the shutter to a position where, as seen in Figures 1 and 4 to 6, it extends horizontally to intercept the light passing through the lens systems 10 and 11.

Figure 5:
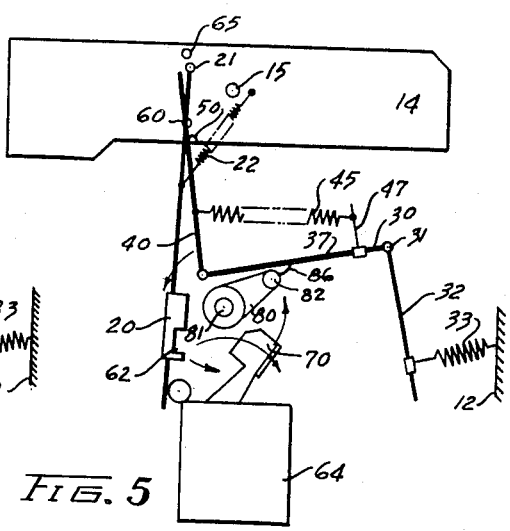
Figure 5 is a schematic diagram showing the operating handle rotated through approximately 270° counterclockwise to initiate the operation of the shutter opening mechanism.
Figure 6:
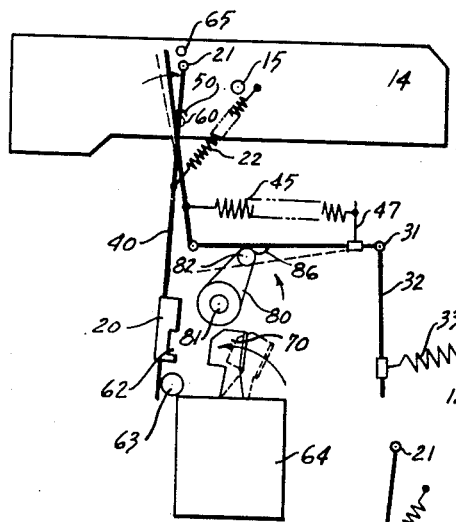
Figure 6 is a schematic diagram showing the next position during the shutter opening operation with the operating handle rotated through an additional angle of approximately 30° to engage the shutter opening elements with the shutter.
Figure 7:
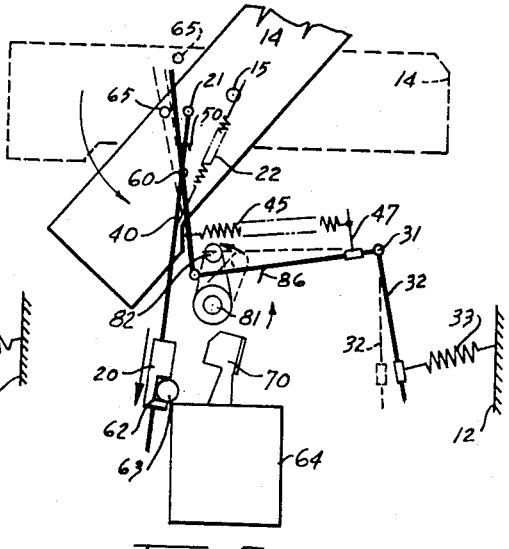
Figure 7 is a schematic diagram corresponding to the view of Figure 2 and showing the manner in which the operating elements have moved the shutter to the open position where it is latched open.

In order to move the shutter 14 from the horizontal position of Figures 1 and 4 to 6 to the angularly displaced open position of Figures 2 and 7, it is thus necessary to overcome the bias of the spring 22. For this purpose the bell crank lever 30 rotatably mounted on the pin 31, supported by the casing 12, is provided. Bell crank lever 30 has a downwardly extending arm 32 which is connected at 34 to the tension spring 33, the opposite end of which spring is secured at 35 to the casing. This normally biases the bell crank lever 30 to rotate in a counterclockwise direction and thereby biasing the opposite or substantially horizontal arm 37 of the bell crank lever 30 to a movement in a downward direction.

The outer end 38 of the substantially horizontal arm 37 is pivotally connected to the shutter lowering arm 40. Shutter lowering arm 40 is biased into clockwise direction around its pivotal mounting on the end 38 of lever arm 37 by the tension spring 45 which is connected between the point 46 on arm 40 and lug 47 on arm 37 adjacent the pin 31.

The shutter lowering arm 40 is provided adjacent its upper end with the hook 50 and the recess 51 just above it. When therefore the arm 37 is rotated in a clockwise direction extending the tension spring 33, the shutter lowering arm 40 is raised vertically. The side of the shutter lowering arm 40 which is provided with the hook 50 and the recess 51 bears against the pin 60 on the shutter, the recess 51 being located opposite the pin 60 when the shutter is in intercepting position as in Figure 1; the pin 60 limits the degree to which the upper end of the shutter lowering arm 40 may rotate in a clockwise direction under the influence of spring 45.

When now the shutter lowering arm 40 is raised by rotation of the bell crank lever 30 to extend spring 33 by the means hereinafter described, the hook 50 snaps over the pin 60 as shown in the schematic diagram of Figure 6. When the lifting force is removed from the bell crank lever arm 37 and the shutter lowering arm 40, then the tension spring 33 will rotate the bell crank lever 30 in a counterclockwise direction to lower the arm 40 and to pull down the side 16 of the shutter 14 by reason of the engagement of the hook 50 with the pin 60, to move the elements to the position shown in Figures 2 and 7.

At this time the latching detent 62 and the latch arm 20 snaps over the latching pin 63 on the housing 64 of the timing mechanism, the latch arm 20 being biased to this latching engagement by the tension spring 22. The shutter 14 is thus held in the open position of Figures 2 and 7 by the engagement of the latching detent 62 of latching arm 20 with the latching pin 63. The shutter 14 should now be in such condition that it can return to the intercepted position of Figure 1 simply on release of the latching arm 20 from the latching pin 63.

For this purpose it is necessary that the hook 50 be released from the pin 60 and the shutter lowering arm. In order to accomplish this result, an additional pin 65 is provided on the side 16 of shutter 14, the said pin being located vertically above the pin 60 and being so arranged that when the shutter 14 rotates from the position of Figure 1 to the position of Figure 2, the pin 65 will bear against the side of the shutter lowering arm 40 to push the upper end of the arm 40 to the left where the hook 50 thereof will be pushed off the pin 60 as shown in Figures 2 and 7.

Figure 8:
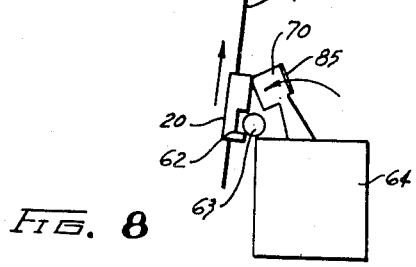
Figure 8 is a fragmentary schematic diagram showing the manner in which the latch mechanism is released at the conclusion of the timing interval.

When the shutter 14 is in the raised position of Figure 1, the time operated lever 70 operated by the timing mechanism in housing 64 is in the position shown in Figures 1, 4 and 8 where it prevents engagement of the latch detent 62 of latch arm 20 with the latching pin 63. Thus it is necessary before the latching operation takes place to move the lever 70 toward the right to permit the latching detent 62 of latch arm 20 to engage pin 63.

The lever 70 is connected to the clockwork mechanism in the housing 64 so that when the lever 70 is pushed to the right, it winds up the clock mechanism which then by appropriate well-known escapement means causes lever 70 to rotate back from the position of Figures 2 and 7 to the position of Figure 1. When the lever 70 once more reaches the latch lever 20 on its return movement, then as shown in the schematic view of Figure 8, it pushes the detent 62 off the latching pin 63 to unlatch the shutter and permit the spring 22 to return the shutter and the latching arm 20 back to the positions of Figures 1 and 4.

Thus the operating mechanism must be so arranged that it will by a single operation first move the lever 70 to the right and thereafter raise the arm 37 and the bell crank lever 30 to engage the hook 50 of the shutter lowering arm 40 with the pin 51 on shutter 14. The operating means must then disengage the bell crank lever 30 so that the spring 33 which has been extended by this raising operation will be effective to rotate the bell crank lever 30 in the opposite direction to lower the shutter.

For this purpose a crank 80 is provided, mounted on the shaft 81 and rotatable in a counterclockwise direction with respect to Figures 1, 2 and 4 to 8. The crank 80 is provided with pin 82 at its outer end. The normal position of crank 80 is that shown in Figures 1 and 4. The shaft 81 is provided with an appropriate handle outside the casing, which handle is released in any appropriate manner by the dropping of a coin and thus any appropriate coin-operated mechanism which will release the shaft 81 for one complete rotation may be used.

When the crank 80 is rotated by the shaft 81 in a counterclockwise direction above referred to, at about 160° of its revolution, the pin 82 engages the lateral extension 85 of the time operated latch release lever 70. Further rotation of crank 80 through about 220° from its original position moves the lever 70 to the position of Figure 5 and the dotted line position of Figure 2.

The timing mechanism in housing 64 within the casing 12 is now set for operation and the lever 70 begins to return, the return movement being timed by the timing mechanism in the housing 64.

The crank 80 on its continuation through its single 360° cycle then strikes the horizontal extension 86 of lever 37 of the bell crank lever 30 at about the 320° point in its cycle and lifts the lever 37. The horizontal extension 86 is so dimensioned that the pin 82 of the crank 80 will lift the lever 37 until hook 50 on the shutter lowering arm 40 engages the pin 60 on shutter 14, at which time the pin 82 on continued rotation of crank 80 rolls out from under horizontal extension 86.

At this time the tension spring 33 will be enabled to operate the shutter from the position of Figures 1 and 4 to the position of Figures 2 and 7. The elements now remain in the position of Figures 2 and 7 with the shutter 14 being retained in this position only by the engagement of latching detent 62 of the latch arm 20 with the latching pin 63.

On completion of the timing operation the lever 70 has been moved by the clockwork in housing 64 from the position of Figure 5 back to the position of Figure 8 where it now pushes the latch arm 20 off the latch pin 63 to permit spring 22 to re-set the mechanism.

While I have herein shown my shutter as pivotally mounted between the lens systems on an axis parallel thereto for rotation in a plane normal to the axes of the lens systems, it will be obvious that my novel shutter may be pivoted above or below the lens systems, at one side of the lens systems; and may operate to pivot on an axis normal to the axes of the lens systems.

By this means my invention provides for a novel simplified automatic rotatable shutter which is latched open and then released to the closed position on completion of the timing operation. The various elements are easily accessible for maintenance, replacement and repair and the simplified construction minimizes the necessity for service in the field.

This is particularly important since viewing devices of this type are placed at many widely separated tourist points and must therefore be rugged and require a minimum of maintenance in order to be profitable in use.

In the foregoing I have described my invention solely in connection with illustrative embodiments thereof. Since many variations and modifications of my invention will now be obvious to those skilled in the art, I prefer to be bound not by the specific disclosures herein contained but only by the appended claims.

I claim:

1. In a viewing device, a lens system, a shutter pivotally mounted for rotation from a first position wherein it intercepts light passing through said lens system to a second position where the lens system is open for the passage of light; a latching arm pivotally connected to said shutter at one side of the pivotal mounting thereof; a latch element; biasing means engaging said latch arm and urging said shutter to said first position and urging said latch arm toward engagement with said latch element; means for moving said shutter from the first position to the second position, said latch arm moving therewith to a position where it engages said latch element, said means comprising a latch lowering arm; means at the end of the latch lowering arm for engaging the shutter; a member operable to move the latch lowering arm into engagement with the shutter while the shutter is in the first position; additional means for moving the latch lowering arm back to its original position to move the shutter to the second position.

2. In a viewing device, a lens system, a shutter pivotally mounted for rotation from a first position wherein it intercepts light passing through said lens system to a second position where the lens system is open for the passage of light; a latching arm pivotally connected to said shutter at one side of the pivotal mounting thereof; a latch element; biasing means engaging said latch arm and urging said shutter to said first position and urging said latch arm toward engagement with said latch element; means for moving said shutter from the first position to the second position, said latch arm moving therewith to a position where it engages said latch element, said means comprising a latch lowering arm; means at the end of the latch lowering arm for engaging the shutter; a member operable to move the latch lowering arm into engagement with the shutter while the shutter is in the first position; additional means for moving the latch lowering arm back to its original position to move the shutter to the second position, said latch lowering arm being disengaged from the shutter when the shutter is moved to the second position.

3. In a viewing device, a lens system, a shutter pivotally mounted for rotation from a first position wherein it intercepts light passing through said lens system to a second position where the lens system is open for the passage of light; a latching arm pivotally connected to said shutter at one side of the pivotal mounting thereof; a latch element; biasing means engaging said latch arm and urging said shutter to said first position and urging said latch arm toward engagement with said latch element; means for moving said shutter from the first position to the second position, said latch arm moving therewith to a position where it engages said latch element, said means comprising a latch lowering arm; means at the end of the latch lowering arm for engaging the shutter; a crank member operable to move the latch lowering arm into engagement with the shutter while the shutter is in the first position; a spring for moving the latch lowering arm back to its original position to move the shutter to the second position.

4. In a viewing device, a lens system, a shutter mounted for movement from a first position wherein it intercepts light passing through said lens system to a second position where the lens system is open for the passage of light; a latching arm connected to said shutter; a latch element; biasing means engaging said latch arm and urging said shutter to said first position and urging said latch arm toward engagement with said latch element; means for moving said shutter from the first position to the second position, said latch arm moving therewith to a position where it engages said latch element, said means comprising a latch lowering arm; means at the end of the latch lowering arm for engaging the shutter; a crank member operable to move the latch lowering arm into engagement with the shutter while the shutter is in the first position; a spring for moving the latch lowering arm back to its original position to move the shutter to the second position, and a lever movable toward said latch arm for releasing said latch arm from said latch element, said lever being displaceable away from said latch arm when the latch arm and shutter are moved to the second position, said crank member also displacing said lever.

5. In a viewing device, a lens system, a shutter pivotally mounted for rotation in a plane transverse to the axis of said lens system from a first position wherein it intercepts light passing through said lens system to a second position where the lens system is open for the passage of light; a latching arm pivotally connected to said shutter at one side of the pivotal mounting thereof; a latch element; biasing means engaging said latch arm and urging said shutter to said first position and urging said latch arm toward engagement with said latch element; means for moving said shutter from the first position to the second position, said latch arm moving therewith to a position where it engages said latch element, said means comprising a latch lowering arm; means at the end of the latch lowering arm for engaging the shutter; a crank member operable to move the latch lowering arm into engagement with the shutter while the shutter is in the first position; a spring for moving the latch lowering arm back to its original position to move the shutter to the second position, and a lever movable toward said latch arm for releasing said latch arm from said latch element, said lever being displaceable away from said latch arm when the latch arm and shutter are moved to the second position, said crank member also displacing said lever immediately prior to the movement of the latch arm and shutter to the second position.

6. In a viewing device, a lens system, a shutter pivotally mounted for rotation in a plane transverse to the axis of said lens system from a first position wherein it intercepts light passing through said lens system to a second position where the lens system is open for the passage of light; a latching arm pivotally connected to said shutter at one side of the pivotal mounting thereof; a latch element; biasing means engaging said latch arm and urging said shutter to said first position and urging said latch arm toward engagement with said latch element; means for moving said shutter from the first position to the second postion, said latch arm moving therewith to a position where it engages said latch element, said means comprising a latch lowering arm; means at the end of the latch lowering arm for engaging the shutter; a bell crank lever connected to said latch lowering arm; spring means biasing said bell crank lever and latch lowering arm to one position; a member operable to move the bell crank lever and latch lowering arm to another position where the latch lowering arm engages said shutter while the shutter is in the first position; said spring means thereafter moving the bell crank lever and latch lowering arm back to their original first mentioned position to move the shutter to the second position.

7. In a viewing device, a lens system, a shutter pivotally mounted for rotation in a plane transverse to the axis of said lens system from a first position wherein it intercepts light passing through said lens system to a second position where the lens system is open for the passage of light; a latching arm pivotally connected to said shutter at one side of the pivotal mounting thereof; a latch element; biasing means engaging said latch arm and urging said shutter to said first position and urging said latch arm toward engagement with said latch element; means for moving said shutter from the first position to the second position, said latch arm moving therewith to a position where it engages said latch element, said means comprising a latch lowering arm; means at the end of the latch lowering arm for engaging the shutter; a crank member operable to move the latch lowering arm into engagement with the shutter while the shutter is in the first position; a spring for moving the latch lowering arm back to its original position to move the shutter to the second position, and a lever movable toward said latch arm for releasing said latch arm from said latch element, said lever being displaceable away from said latch arm when the latch arm and shutter are moved to the second position, said crank member also displacing said lever.

LAWRENCE EARL HAMILTON.

REFERENCES CITED

The following references are of record in the file of this patent:

UNITED STATES PATENTS

| Number | Name | Date |
| --- | --- | --- |
| 1,583,143 | Hansen | May 4, 1926 |